(12) United States Patent
Haltom et al.

(10) Patent No.: US 10,165,117 B2
(45) Date of Patent: Dec. 25, 2018

(54) CALL HANDLING BASED ON AUGMENTED CALLER INFORMATION

(71) Applicant: Verizon Patent and Licensing Inc., Arlington, VA (US)

(72) Inventors: Jeffrey Haltom, Fishers, IN (US); Lulia Ann Barakat, McKinney, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/794,773

(22) Filed: Oct. 26, 2017

(65) Prior Publication Data

US 2018/0048764 A1 Feb. 15, 2018

Related U.S. Application Data

(63) Continuation-in-part of application No. 15/695,356, filed on Sep. 5, 2017, which is a continuation of
(Continued)

(51) Int. Cl.
*H04M 1/725* (2006.01)
*H04M 3/436* (2006.01)
(Continued)

(52) U.S. Cl.
CPC ..... *H04M 3/4365* (2013.01); *H04M 3/42034* (2013.01); *H04M 3/42042* (2013.01);
(Continued)

(58) Field of Classification Search
CPC .... H04M 3/42042; H04M 1/57; H04M 1/575; H04M 1/72525; H04M 1/72522;
(Continued)

(56) References Cited

U.S. PATENT DOCUMENTS 5,642,410 A 6/1997 Walsh
7,120,469 B1* 10/2006 Urakawa ......... H04M 1/274566
455/564
(Continued)

OTHER PUBLICATIONS

Wikipedia, "Caller ID," https://en.wikipedia.org/wiki/Caller_ID, Mar. 14, 2016, 10 pages.
(Continued)

*Primary Examiner* — Danh C Le

(57) ABSTRACT

A device can receive a call from a calling party device to a called party device, and can determine caller information based on the call from the calling party device. The device can determine that the caller information satisfies a criterion, and can modify the caller information to create modified caller information, the caller information being modified based on the caller information satisfying the criterion. The device can compare the modified caller information to a data structure that includes information associated with multiple call handling decisions. The device can identify a call handling decision, of the multiple call handling decisions, based on comparing the modified caller information to the data structure that includes the plurality of call handling decisions, and can cause the call handling decision to be implemented.

20 Claims, 7 Drawing Sheets

Related U.S. Application Data application No. 15/082,249, filed on Mar. 28, 2016, now Pat. No. 9,774,731.

(51) Int. Cl.

| | | |
|---|---|---|
| *H04Q 3/06* | (2006.01) | |
| *H04M 3/42* | (2006.01) | |
| *H04Q 3/66* | (2006.01) | |
| *H04Q 3/72* | (2006.01) | |
| *H04M 1/57* | (2006.01) | |
| *H04W 8/24* | (2009.01) | |

(52) U.S. Cl.
CPC ................. *H04Q 3/06* (2013.01); *H04Q 3/66* (2013.01); *H04Q 3/72* (2013.01); *H04M 1/57* (2013.01); *H04M 1/72519* (2013.01); *H04Q 2213/13256* (2013.01); *H04W 8/245* (2013.01)

(58) Field of Classification Search
CPC ............. H04M 1/72519; H04W 8/245; H04W 88/02; H04W 3/66; H04Q 3/0016; H04Q 2213/13141
USPC .................. 455/415, 418, 550.1; 379/221.01
See application file for complete search history.

(56) References Cited

U.S. PATENT DOCUMENTS

| | | | |
|---|---|---|---|
| 7,203,301 B1 | 4/2007 | Mudd | |
| 7,813,490 B2 | 10/2010 | DeMent | |
| 8,306,191 B2* | 11/2012 | Balasaygun | H04M 3/42042 379/88.02 |
| 8,442,209 B2 | 5/2013 | Waalkes | |
| 8,555,297 B1* | 10/2013 | Gould | G06F 9/547 719/330 |
| 8,799,352 B2 | 8/2014 | Cohen | |
| 9,124,957 B1 | 9/2015 | Fogel | |
| 9,734,501 B2* | 8/2017 | Durney | G06Q 20/4016 |
| 2001/0043697 A1 | 11/2001 | Cox et al. | |
| 2003/0224764 A1 | 12/2003 | Baker | |
| 2004/0114571 A1 | 6/2004 | Timmins | |
| 2005/0276386 A1 | 12/2005 | Ethier | |
| 2009/0086947 A1* | 4/2009 | Vendrow | H04M 3/02 379/201.12 |
| 2010/0158983 A1 | 6/2010 | Davis | |
| 2011/0075675 A1* | 3/2011 | Koodli | H04L 12/14 370/401 |
| 2012/0099719 A1* | 4/2012 | Erb | H04M 3/436 379/211.01 |
| 2012/0175412 A1* | 7/2012 | Grabiner | G06F 19/327 235/375 |
| 2012/0189111 A1* | 7/2012 | Siminoff | H04M 3/42068 379/201.01 |
| 2013/0272513 A1 | 10/2013 | Phadnis | |
| 2014/0169547 A1* | 6/2014 | Murgai | H04M 3/5175 379/265.03 |
| 2015/0350857 A1* | 12/2015 | Lim | H04M 3/54 455/41.2 |
| 2016/0321406 A1 | 11/2016 | Timmerman et al. | |
| 2017/0017834 A1 | 1/2017 | Sabitov et al. | |

OTHER PUBLICATIONS

Lee, "Fullscreen Caller ID on the iPhone," http://www.itchban.com/blog/2015/1/23/fullscreen-caller-id-on-iphone, Jan. 27, 2015, 7 pages.

Wikipedia, "LIDB," https://en.wikipedia.org/wiki/LIDB, Sep. 26, 2012, 1 page.

Lunden, "Truecaller Extends Live Caller ID to Its iOS App to Fight Spam and Scam Calls," http://techcrunch.com/2014/04/22/truecaller-extends-live-caller-id-to-its-ios-app-to-fight-spam-and-scam-calls/, Apr. 22, 2014, 9 pages.

\* cited by examiner

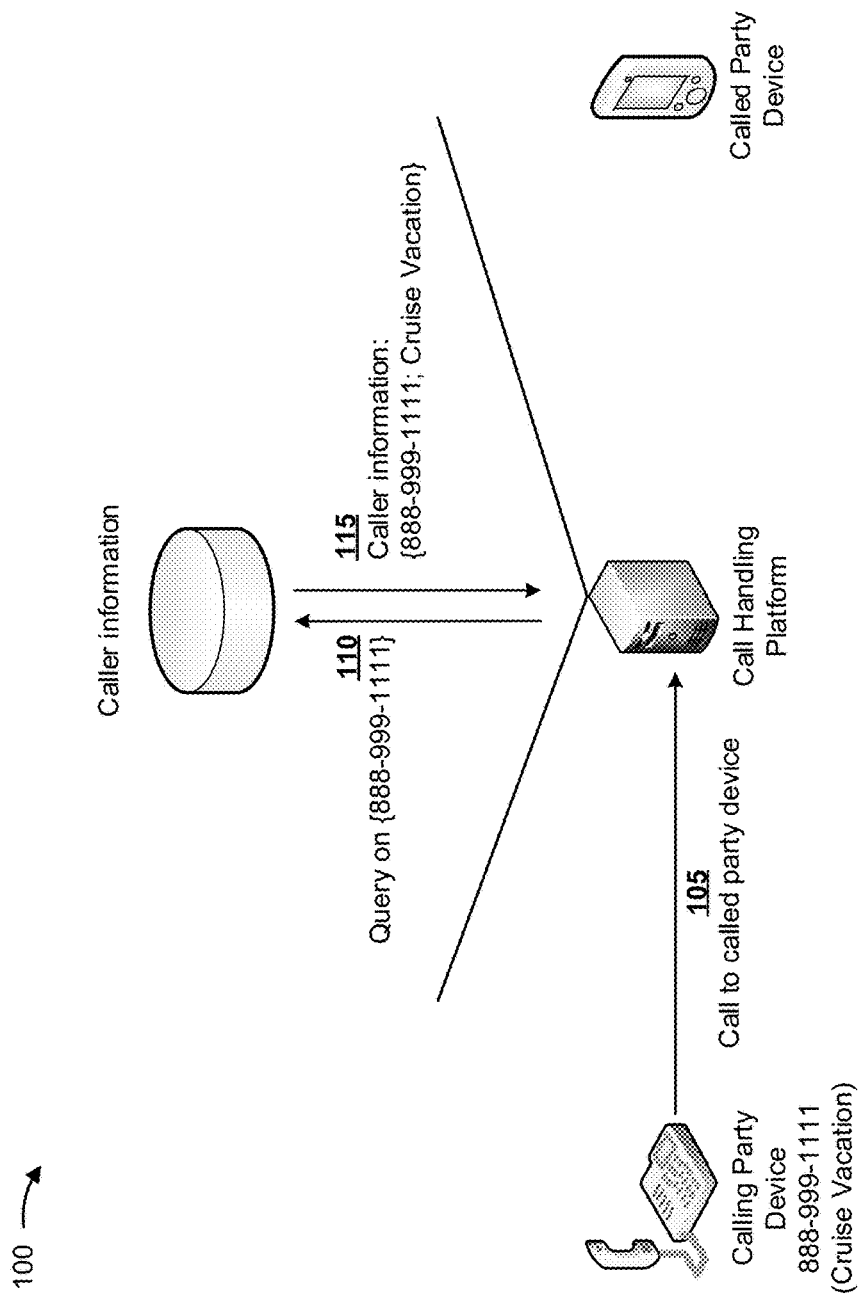

CALL HANDLING BASED ON AUGMENTED CALLER INFORMATION

RELATED APPLICATIONS

This application is a continuation-in-part (CIP) of U.S. patent application Ser. No. 15/695,356, filed on Sep. 5, 2017, which is a continuation of U.S. patent application Ser. No. 15/082,249, filed on Mar. 28, 2016, the contents of which applications are incorporated by reference herein in their entireties.

BACKGROUND

A calling party device (e.g., a device associated with a calling party) can attempt to establish a connection with a called party device (e.g., a device associated with a called party). An identification service (e.g., a caller identification (ID) service) can allow caller information (e.g., identification information associated with the calling party device, such as a caller number or a caller name) to be received by the called party device. The caller information can be displayed by the called party device.

BRIEF DESCRIPTION OF THE DRAWINGS

FIGS. 1A-1D are diagrams of an overview of an example implementation described herein;

DETAILED DESCRIPTION OF PREFERRED EMBODIMENTS

The following detailed description of example implementations refers to the accompanying drawings. The same reference numbers in different drawings can identify the same or similar elements.

Some regulations permit entities, such as telecommunications carriers, to block certain types of calls (e.g., robocalls) to called party devices, and provide services to customers (e.g., users of the called party devices) that enable the customers to cause such calls to be blocked. Entities, such as telecommunications carriers, have made substantive efforts to reduce the number of unwanted calls such as robocalls. Despite such efforts, however, a large number of unwanted calls are still being received by called party devices.

A user of a called party device can decide how to handle an incoming call (e.g., to answer, block, or ignore the call) before actually accepting the call. The user of the called party device, or a service acting on behalf of the user, can decide how to handle an incoming call based on caller information (e.g., identification information associated with the calling party device, such as a caller number or a caller name) that is received by the called party device before accepting the call. However, the caller information (e.g., a caller number or a caller name), received before accepting a call, often provides an insufficient basis to make a decision about how to handle the call. Furthermore, the called party device and other devices (e.g., customer premise device, network device, and/or the like) are not able to automatically handle calls based on the caller information (e.g., a caller number or a caller name).

Some implementations, described herein, can provide a call handling platform that adds or augments additional information (e.g., information beyond a caller number and/or a caller name) to caller information associated with an incoming call, and utilizes the additional information to determine how to handle the incoming call. For example, the call handling platform can forward the call, the caller information, and the additional information to a called party device, can play a captcha before forwarding the call to the called party device, can forward the call to a voicemail, can prevent the call from being provided to the called party device, and/or the like.

Figure 1B:
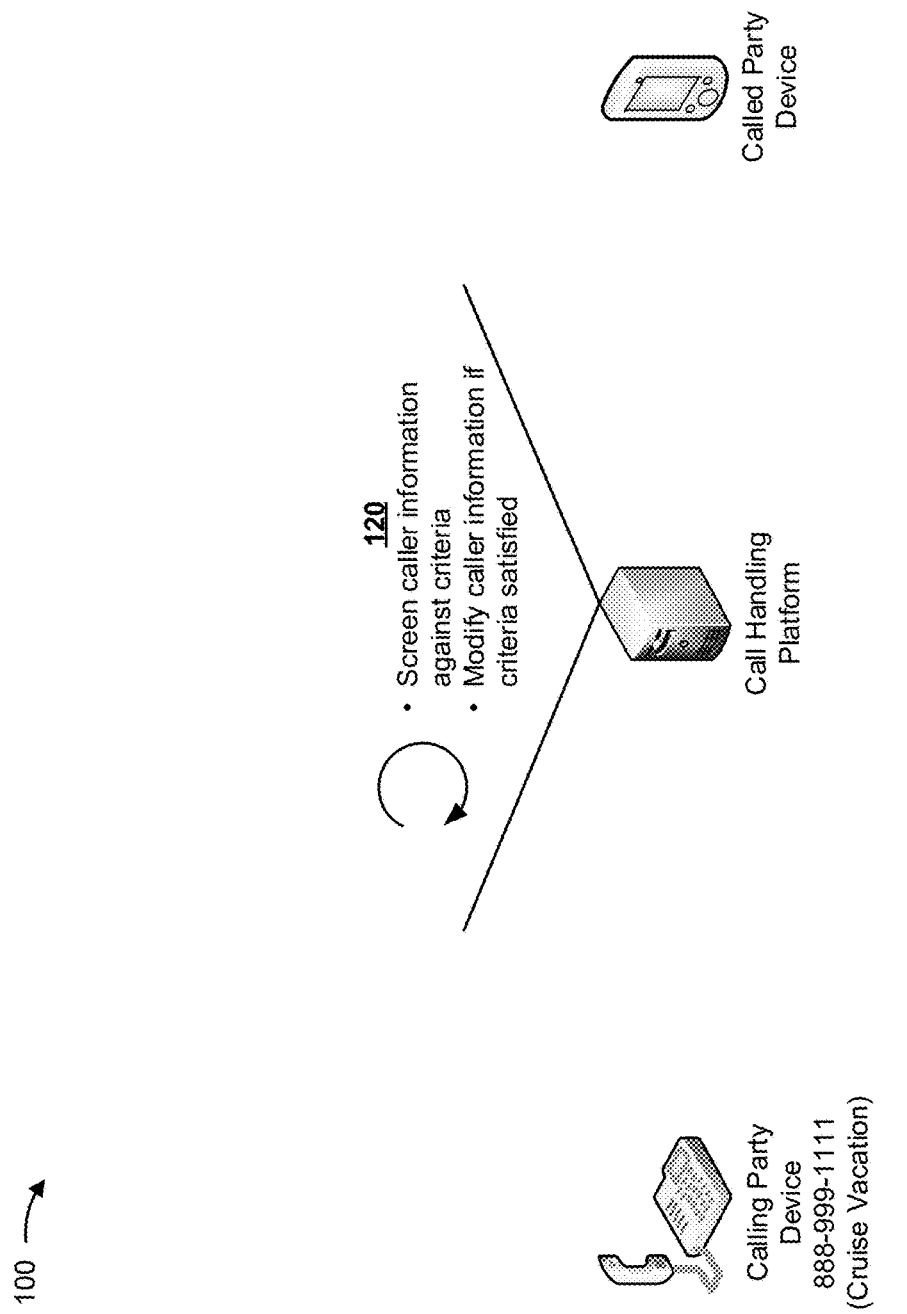

FIGS. 1A-1D are diagrams of an overview of an example implementation 100 described herein. As shown in FIG. 1A, assume that a calling party device, having a caller number (e.g., a telephone number) of 888-999-1111 and being associated with a Cruise Vacation, initiates a call to (e.g., to establish a connection with) a called party device.

As shown by reference number 105, the calling party device can call the called party device (e.g., send a request to establish a connection with the called party device). The call can be routed through one or more telephone networks and/or one or more other types of networks to a call handling platform. In some implementations, the call (e.g., the request to establish a connection) can include calling party device information (e.g., a caller number or other identification information associated with the calling party device).

The call handling platform can obtain calling party device information (e.g., the caller number: 888-999-1111) for the calling party device based on the request to establish a connection. As shown by reference number 110, the call handling platform can generate a query, based on the calling party device information (e.g., the caller number: 888-999-1111), to utilize with a call information data structure associated with the call handling platform. Based on the query, the call handling platform can identify caller information (e.g., the caller number and caller name: {888-999-1111; Cruise Vacation}) for the calling party device in the call information data structure, as shown by reference number 115.

As shown by reference number 120 in FIG. 1B, the call handling platform can screen the caller information against predetermined criteria (e.g., a time of day, a time range, a pattern, a ranking, a list of caller numbers and/or caller names, a presence of predetermined words, and/or the like). If the caller information satisfies the criteria, the call handling platform can determine that the caller information is to be modified based on the criteria. If the caller information does not satisfy the criteria, the call handling platform can determine that the caller information is not to be modified. In some implementations, the criteria can be specified by the call handling platform, by the called party device, by a combination of the call handling platform and the called party device, and/or the like.

Figure 1C:
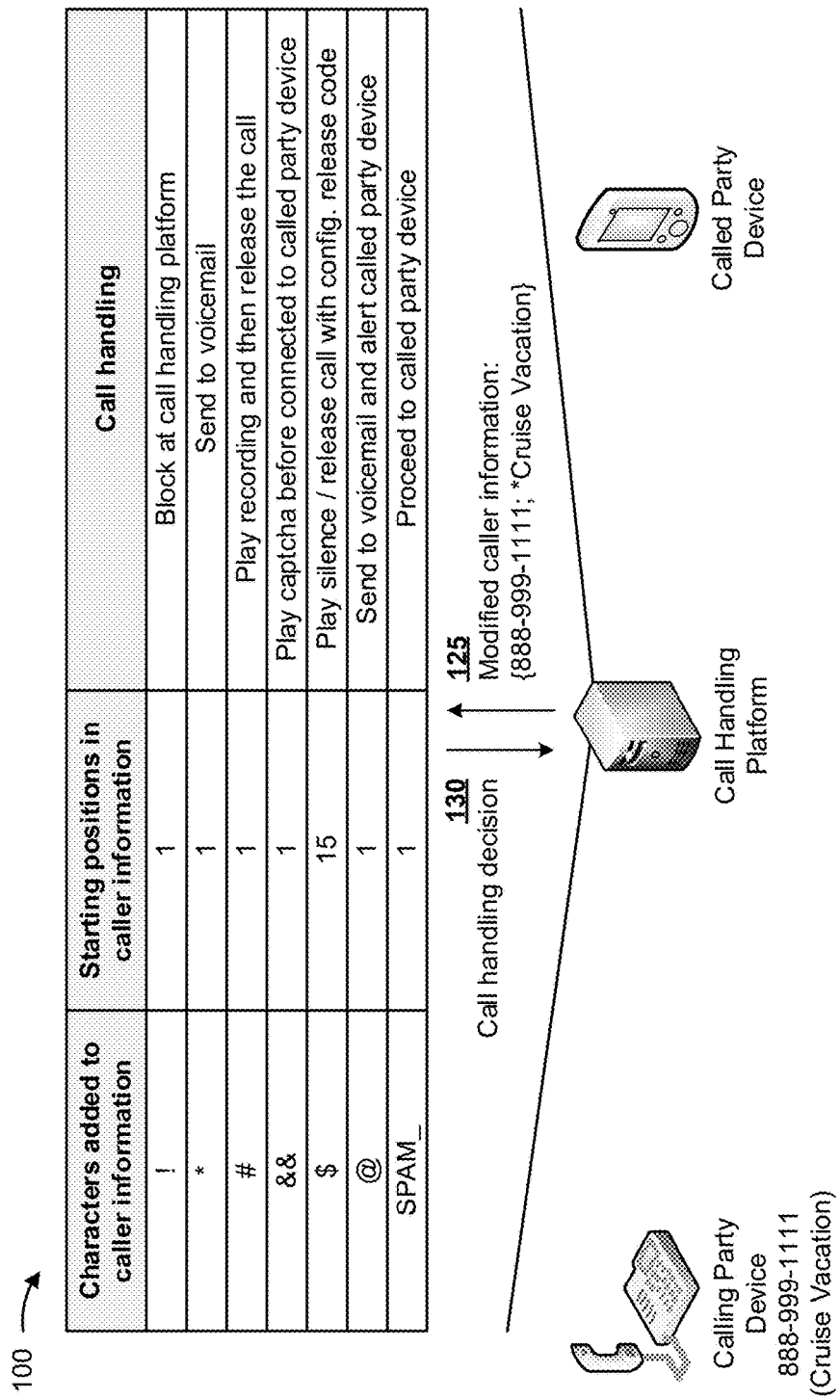

As shown in FIG. 1C, assume that the caller information (e.g., the caller number and caller name: {888-999-1111; Cruise Vacation}) satisfies the criteria, and that the call handling platform modified the caller information (e.g., by inserting an "*" at the start of the caller name field). Then, as shown by reference number 125, the call handling platform can compare the modified caller information (e.g., {888-999-1111; *Cruise Vacation}) with a call handling data structure (e.g., a table) that provides call handling decisions. The call handling table can include a character field associated with characters added to the caller information (e.g., the "*" at the start of the caller name field), a starting position field associated with starting positions of the characters in the caller information (e.g., the "*" is provided at a first or "1" position in the caller information), a call handling field associated with call handling decisions based on the character field and the starting position field, and multiple entries associated with the fields. In some implementations, the information provided in the call handling data structure can be specified by the call handling platform, by the called party device, by a combination of the call handling platform and the called party device, and/or the like.

In some implementations, a user (e.g., of the called party device) can customize the way in which calls are handled by the call handling platform. For example, the call handling platform (or a system associated with the call handling platform) can provide a user interface via which the user can modify call handling decisions identified in the call handling field, such that a particular character in a particular starting position will cause the call handling platform to perform the call handling decision specified by the user. Furthermore, based on an addition or modification to the character field and/or starting position field, the user can cause the call handling platform to associate any character in any portion of the caller information with a particular call handling decision.

The character field can include a variety of information added to the caller information, such as one or more numbers (e.g., 1, 2, 3, ...), one or more letters (e.g., a, b, c, ..., A, B, C, ...), one or more characters (e.g., !, @, #, $, %, ^, &, *, ...), one or more words, a combination of one or more numbers, letters, characters, and/or words, other displayable output, and/or the like. The starting position field can include a number (e.g., 1, 2, 3 ...) associated with starting positions of the characters in the caller information. The call handling field can include a variety of call handling decisions, such as blocking the call at the call handling platform, sending the call to voicemail, playing a recording and releasing the call, playing a captcha before connecting the call to the called party device, playing silence and releasing the call with a configurable release code (e.g., a configurable session initiation protocol (SIP) release code), sending the call to voicemail and providing an alert message (e.g., a short message service (SMS) message) to the called party device, providing the call and the modified caller information to the called party device, and/or the like.

As indicated by reference number 130 in FIG. 1C, the call handling platform can determine a call handling decision based on comparing the modified caller information (e.g., {888-999-1111; *Cruise Vacation}) with the call handling data structure. For example, based on the "*" provided at the start of the caller name field, the call handling platform can determine that the call handling decision is to send the call to voicemail. In some implementations, the call handling platform can implement the determined call handling decision.

Figure 1D:
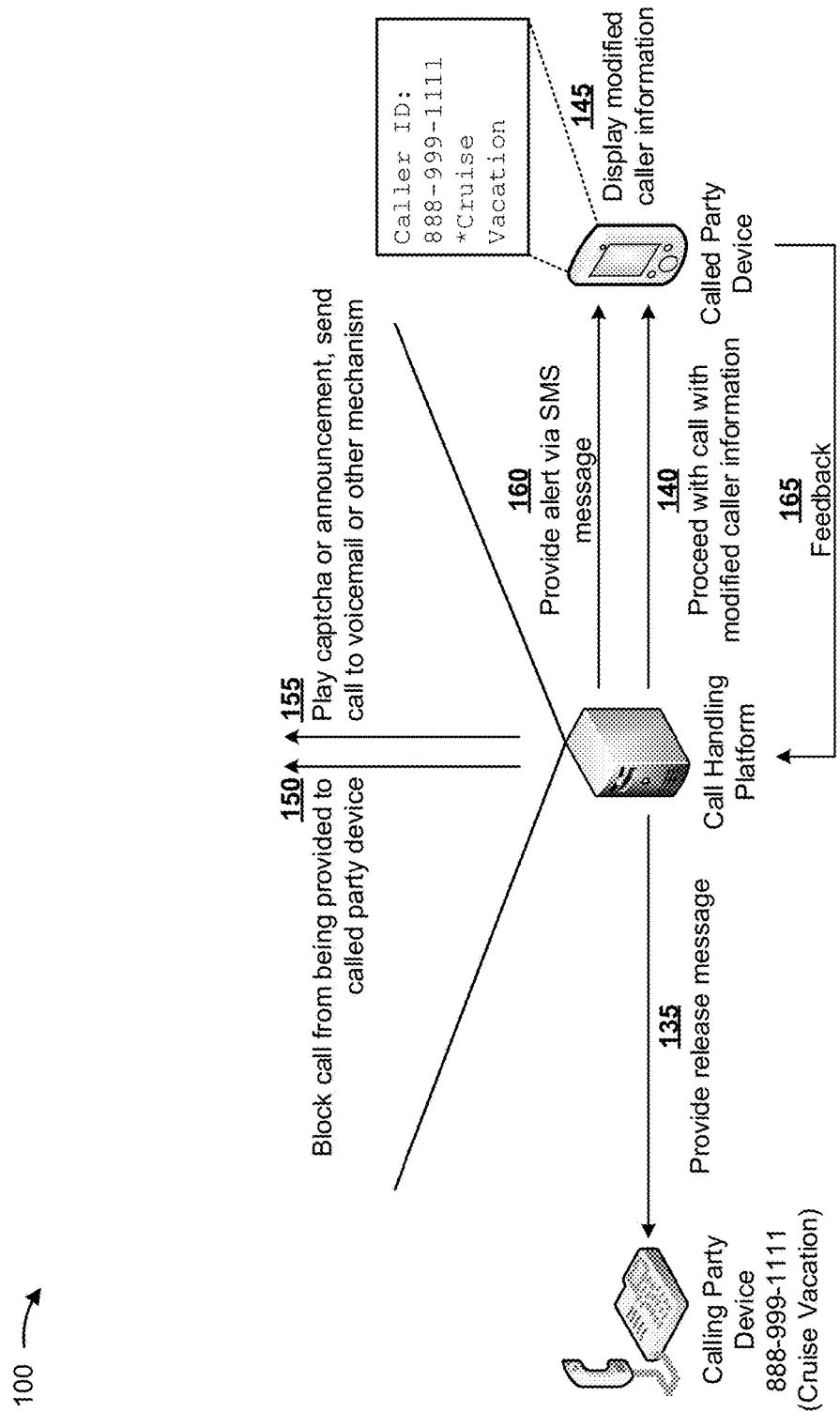

FIG. 1D provides example implementations of call handling decisions. In some implementations, and as shown by reference number 135, the call handling platform can release the call and provide a configurable release code to the calling party device. In some implementations, the call handling platform can play an announcement, play silent audio, and/or the like prior to releasing the call. In some implementations, and as shown by reference number 140, the call handling platform can route the call (e.g., the request to establish a connection with the called party device), with the modified caller information, to the called party device. As shown by reference number 145, the called party device can display the modified caller information (e.g., as part of a caller ID display).

In some implementations, and as shown by reference number 150, the call handling platform can block or prevent the call from being provided to (e.g., not establish a connection with) the called party device. In some implementations, and as shown by reference number 155, the call handling platform can play an audio captcha, an announcement, and/or the like prior to providing the call to the called party device. In such implementations, the calling party device may need to properly respond to the captcha or the announcement (e.g., to prevent machine-based calls), before the call handling platform will provide the call to the called party device. As further shown by reference number 160, the call handling platform can provide the call to voicemail, and can alert the called party device (e.g., via a message, such as a SMS message, indicating that that call satisfies criteria, is suspicious in nature, and/or the like). In some implementations, the call handling platform can provide, to the called party device, a signal that causes the called party device to display particular information (e.g., a certain color, a flashing light, and/or the like), emit a sound, and/or the like, based on the call handling decision. In some implementations, the call handling platform can provide an error message to the calling party device, based on the call handling decision.

In some implementations, and as shown by reference number 165, information associated with how the called party device handles the call (e.g., block the call number, receive the call, send the call to voicemail, and/or the like) can be provided to the call handling platform in the form of feedback information. In such implementations, the call handling platform can utilize the feedback information to modify or update the predetermined criteria (e.g., a time of day, a time range, a pattern, a ranking, a list of caller numbers and/or caller names, a presence of predetermined words, and/or the like). For example, if the call is provided to the called party device and the called party device blocks the call number, the call handling platform can update the predetermined criteria to indicate that a future call from the calling number should be augmented with a character (e.g., "!") indicating that the call should be blocked. The call handling platform can also utilize the feedback to modify or update the information provided in the call handling data structure shown in FIG. 1C. In some implementations, the call handling platform can perform analytics on feedback information received from multiple called party devices, and utilize results of the analytics to modify or update, the predetermined criteria, the call handling decisions, call handling policies, and/or the like.

In some implementations, the call handling platform can provide the call handling functions described herein as an enhancement to an existing caller ID function (e.g., provided by a telecommunications carrier). In some implementations, the call handling platform can provide the call handling functions described herein as part of a parental control function (e.g., provided by a telecommunications carrier). In some implementations, the call handling platform can provide the call handling functions described herein as one or more software applications (e.g., for CDMA and/or voice over long term evolution (VoLTE) technologies), and/or as a feature of one or more software applications.

In this way, implementations described herein can provide a call handling platform that modifies caller information, associated with an incoming call, to add additional information to the caller information, and utilizes the additional information to determine how to handle the incoming call. Enabling informed call handling decisions with regard to incoming calls can reduce a number of unwanted calls that are accepted by a called party device, which can reduce network resources that might otherwise be consumed handling unwanted calls. Reducing the number of unwanted calls that are accepted by a called party device can also conserve resources on the calling party device and/or the called party device by not connecting a call that the called party is not interested in receiving.

As indicated above, FIGS. 1A-1D are provided merely as an example. Other examples are possible and can differ from what was described with regard to FIGS. 1A-1D. For example, although implementations, described herein, relate to augmenting information (e.g., characters) to a calling name associated with a call, in some implementations, information can be augmented to other parameters associated with the call, such as a calling number, a signaling parameter, and/or the like.

Figure 2:
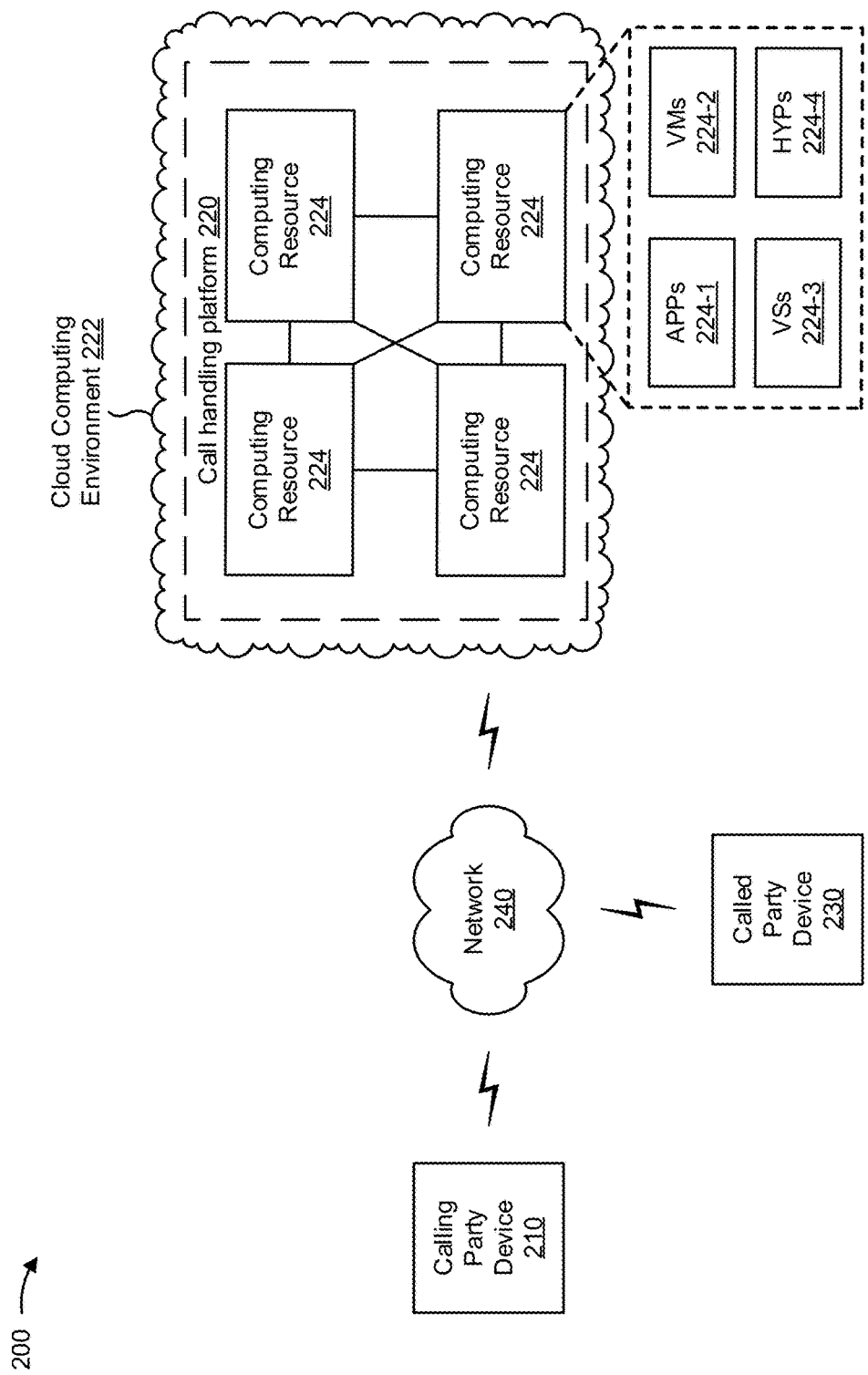
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a calling party device 210, a call handling platform 220, a called party device 230, and a network 240. Devices of environment 200 can interconnect via wired connections, wireless connections, or a combination of wired and wireless connections.

Calling party device 210 includes a device that is capable of communicating with one or more other devices included in environment 200. For example, calling party device 210 can include a wired communication device, a plain old telephone service (POTS) telephone, a voice over Internet protocol (VoIP) telephone, a wireless communication device, a radiotelephone, a personal communications system ("PCS") terminal (e.g., that can combine a cellular radiotelephone with data processing and data communications capabilities), a smart phone, a desktop computer, a laptop computer, a tablet computer, a personal gaming system, a wearable device, and/or a similar device. In some implementations, calling party device 210 can be capable of receiving and/or providing information associated with an Internet protocol (IP) Multimedia Subsystem (IMS) service.

In some implementations, calling party device 210 can include a device capable of initiating and participating in a call (e.g., a voice call or a video call) with called party device 230 via network 240. In some implementations, calling party device 210 can store and/or transmit identification information associated with calling party device 210.

Call handling platform 220 includes one or more devices that modify caller information, associated with an incoming call from calling party device 210, to add additional information to the caller information, and utilizes the additional information to determine how to handle the incoming call. In some implementations, call handling platform 220 can be designed to be modular such that certain software components can be swapped in or out depending on a particular need. As such, call handling platform 220 can be easily and/or quickly reconfigured for different uses. In some implementations, call handling platform 220 can receive information from and/or transmit information to one or more calling party devices 210 and/or called party devices 230.

In some implementations, as shown, call handling platform 220 can be hosted in a cloud computing environment 222. Notably, while implementations described herein describe call handling platform 220 as being hosted in cloud computing environment 222, in some implementations, call handling platform 220 cannot be cloud-based (i.e., can be implemented outside of a cloud computing environment) or can be partially cloud-based. In some implementations, call handling platform 220 can be provided in customer premise equipment (e.g., set-top boxes (STBs), routers, and/or the like), in network devices (e.g., base stations, routers, switches, and/or the like) associated with network 240, and/or the like.

Cloud computing environment 222 includes an environment that hosts call handling platform 220. Cloud computing environment 222 can provide computation, software, data access, storage, etc. services that do not require end-user knowledge of a physical location and configuration of system(s) and/or device(s) that hosts call handling platform 220. As shown, cloud computing environment 222 can include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 can host call handling platform 220. The cloud resources can include compute instances executing in computing resource 224, storage devices provided in computing resource 224, data transfer devices provided by computing resource 224, etc. In some implementations, computing resource 224 can communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that can be provided to or accessed by calling party device 210 and/or called party device 230. Application 224-1 can eliminate a need to install and execute the software applications on calling party device 210 and/or called party device 230. For example, application 224-1 can include software associated with call handling platform 220 and/or any other software capable of being provided via cloud computing environment 222. In some implementations, one application 224-1 can send/receive information to/from one or more other applications 224-1, via virtual machine 224-2.

Virtual machine 224-2 includes a software implementation of a machine (e.g., a computer) that executes programs like a physical machine. Virtual machine 224-2 can be either a system virtual machine or a process virtual machine, depending upon use and degree of correspondence to any real machine by virtual machine 224-2. A system virtual machine can provide a complete system platform that supports execution of a complete operating system ("OS"). A process virtual machine can execute a single program, and can support a single process. In some implementations, virtual machine 224-2 can execute on behalf of a user (e.g., called party device 230 or an operator of call handling platform 220), and can manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 224-4 can provide hardware virtualization techniques that allow multiple operating systems (e.g., "guest operating systems") to execute concurrently on a host computer, such as computing resource 224. Hypervisor 224-4 can present a virtual operating platform to the guest operating systems, and can manage the execution of the guest operating systems. Multiple instances of a variety of operating systems can share virtualized hardware resources.

Called party device 230 includes a device that is capable of communicating with one or more other devices included in environment 200. For example, called party device 230 can include a wired communication device, a POTS telephone, a VoIP telephone, a wireless communication device, a radiotelephone, a PCS terminal, a smart phone, a desktop computer, a laptop computer, a tablet computer, a personal gaming system, customer premise equipment, a wearable device, and/or a similar device. In some implementations, called party device 230 can be capable of receiving and/or providing information associated with an IMS service.

In some implementations, called party device 230 can include a device capable of initiating and participating in a call (e.g., a voice call or a video call) with calling party device 210 via network 240. In some implementations, called party device 230 can receive and/or display caller information (e.g., identification information associated with calling party device 210) that is included in a request for called party device 230 to establish a connection with calling party device 210.

Network 240 includes one or more wired and/or wireless networks. For example, network 240 can include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
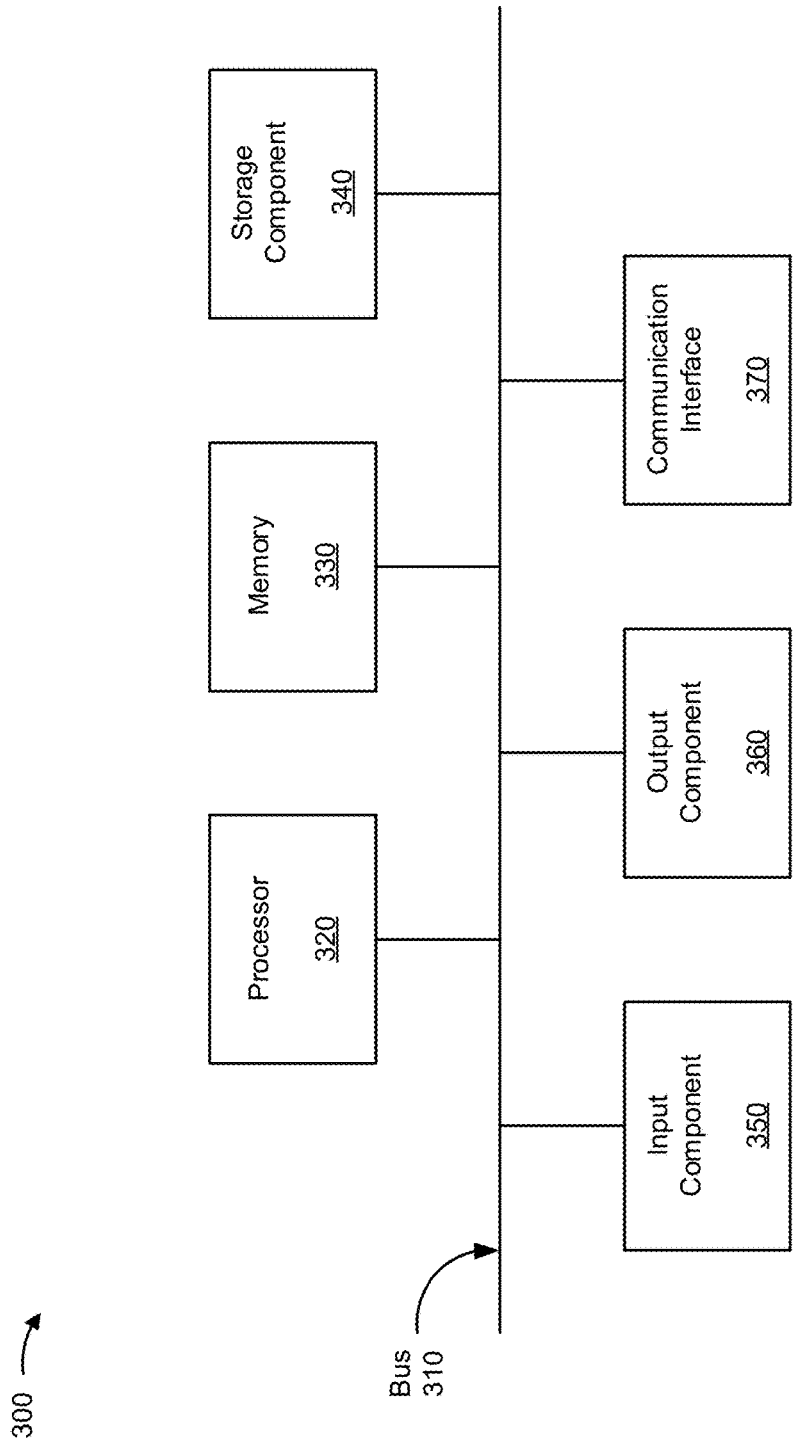
FIG. 3 is a diagram of example components of one or more devices of FIG. 2.

FIG. 3 is a diagram of example components of a device 300. Device 300 can correspond to calling party device 210, call handling platform 220, computing resource 224, and/or called party device 230. In some implementations, calling party device 210, call handling platform 220, computing resource 224, and/or called party device 230 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, and/or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
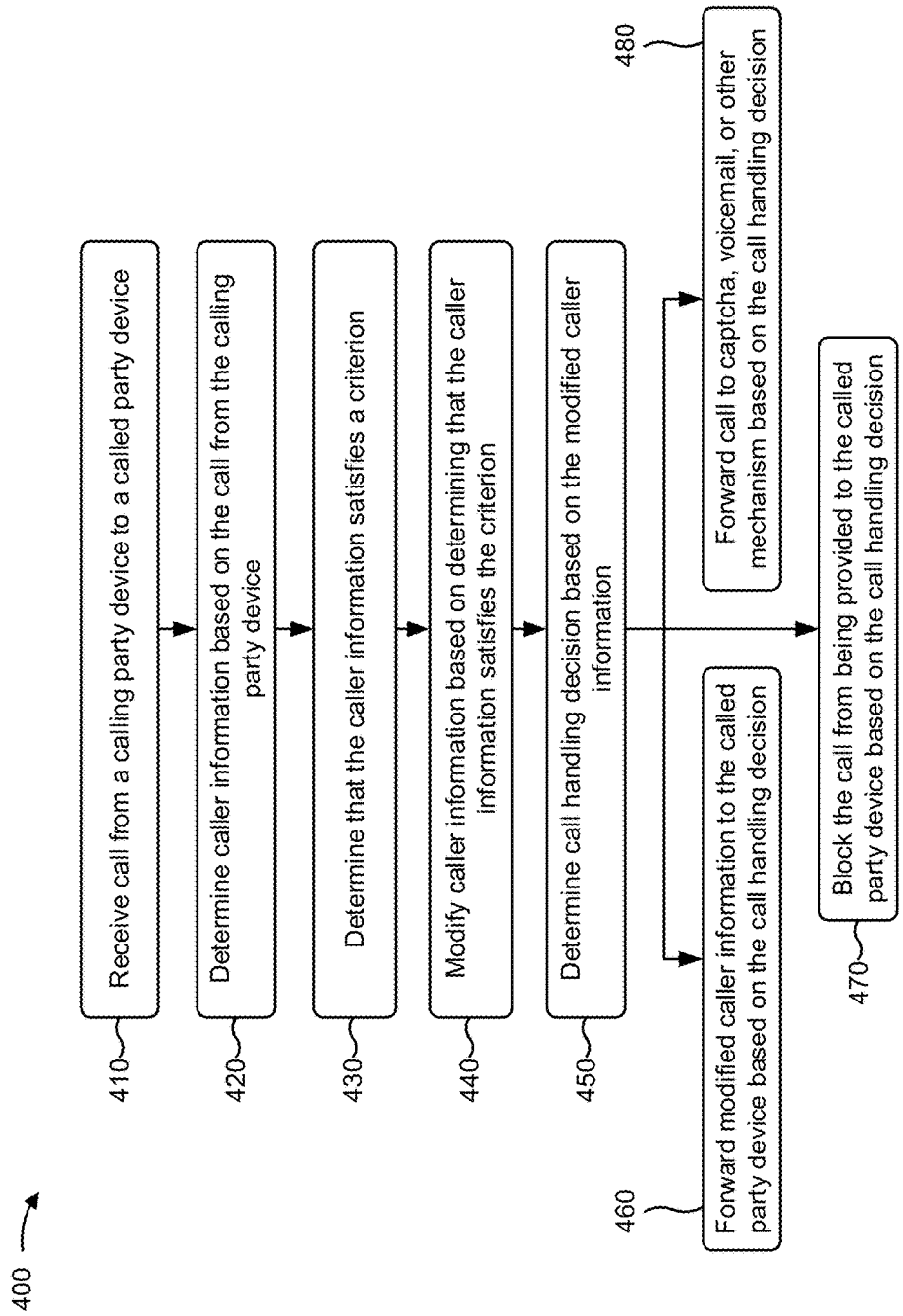
FIG. 4 is a flow chart of an example process for call handling based on augmented caller information.

FIG. 4 is a flow chart of an example process 400 for call handling based on augmented caller information. In some implementations, one or more process blocks of FIG. 4 can be performed by call handling platform 220. In some implementations, one or more process blocks of FIG. 4 can be performed by another device or a group of devices separate from or including call handling platform 220, such as calling party device 210 and/or called party device 230.

As shown in FIG. 4, process can include receiving a call from a calling party device to a called party device (block 410). For example, calling party device 210, having a caller number (e.g., a telephone number) and being associated with a calling name, can initiate a call to (e.g., to establish a connection with) called party device 230. In some implementations, calling party device 210 can call called party device 230 by sending a request to establish a connection with called party device 230. The call can be routed through one or more telephone networks and/or one or more other types of networks (e.g., network 240) to call handling platform 220, and call handling platform 220 can receive the call. In some implementations, the call (e.g., the request to establish a connection) can include calling party device information (e.g., the caller number or other identification information associated with calling party device 210).

As shown in FIG. 4, process 400 can include determining call information based on the call from the calling party device (block 420). For example, call handling platform 220 can determine caller information (e.g., a caller number, a caller name, and/or the like) based on the call from calling party device 210. In some implementations, call handling platform 220 can obtain calling party device information (e.g., the caller number) for calling party device 210 based on the request to establish a connection. In some implementations, call handling platform 220 can generate a query, based on the calling party device information (e.g., the caller number), to utilize with a call information data structure (e.g., a line information database (LIDB), and/or the like) associated with call handling platform 220. Based on the query, call handling platform 220 can identify caller information (e.g., the caller number, a caller name, a caller location, and/or the like) for calling party device 210 in the call information data structure.

In some implementations, call handling platform 220 may have received, from calling party device 210 and via network 240, a request to establish a connection with called party device 230. When call handling platform 220 receives the request to establish a connection with called party device 230, call handling platform 220 can generate and utilize the query with the call information data structure. In some implementations, call handling platform 220 can generate and utilize the query with the call information data structure based on an identity of called party device 230 for which a connection is requested. In some implementations, call handling platform 220 can generate and utilize the query with the call information data structure when a connection is requested to any called party device that is serviced by call handling platform 220.

In some implementations, the query can be based on calling party device information associated with calling party device 210. The calling party device information can include a caller number (e.g., a telephone number) or other identification information (e.g., information present in network data or signaling) associated with calling party device 210. If calling party device 210 is a mobile device, the calling party device information can include a mobile device number (MDN), an international mobile subscriber identity (IMSI), a temporary mobile subscriber identity (TMSI), and/or the like. In some implementations, the query can include the calling party device information.

In some implementations, the caller information can include additional information that corresponds to the caller information and/or the calling party device information. For example, the additional information can include a presentation indicator based on the caller information and/or the calling party device information. In some implementations, the presentation indicator can specify whether presentation (e.g., display) of the caller information (e.g., a caller name or a caller number) and/or the calling party device information (e.g., a caller number) is allowed or disallowed.

As further shown in FIG. 4, process 400 can include determining that the caller information satisfies a criterion (block 430). For example, call handling platform 220 can determine that the caller information satisfies a criterion or a set of criteria, which can include objective and subjective criteria. As used herein, satisfying a criterion can refer to matching one or more items of information, matching multiple items of information, matching a combination of items of information, exhibiting one or more patterns and/or characteristics, satisfying a threshold, and/or the like.

In some implementations, criteria can be defined by a system operator (e.g., an operator of call handling platform 220, called party device 230, and/or network 240). In some implementations, criteria can be defined by a user of called party device 230 and/or an operator of call handling platform 220.

In some implementations, the criteria can include a time of day, a time range, a ranking assigned to caller information (e.g., a trust ranking, a suspicion ranking, an importance ranking), whether the caller information is associated with any reporting to, or action taken by, a governmental body (e.g., the Federal Communications Commission (FCC) in the U.S.), whether the caller information includes predetermined words, and/or the like.

In some implementations, the criteria can include a pattern of calls associated with a caller number and/or a caller name. For example, the criteria can include a behavioral pattern (e.g., calls, from a caller number or a caller name, to multiple different called party devices based on sequential telephone numbers) or a volumetric pattern (e.g., calls, from a caller number or a caller name, to more than a threshold number of called party devices within a predetermined time period).

In some implementations, caller information that satisfies a criterion can indicate that a request to establish a connection with called party device 230 should be rejected. For example, the criterion can be indicative of a request to establish an unwanted (e.g., by a user of called party device 230) connection.

In some implementations, caller information that satisfies a criterion can indicate that a request to establish a connection with called party device 230 should be accepted. For example, the criterion can be indicative of a request to establish an expected (e.g., by a user of called party device 230) or important connection.

In some implementations, caller information that satisfies a criterion can indicate that a request to establish a connection with called party device 230 should be sent to a voicemail. For example, the criterion can be indicative of a request to establish an unexpected (e.g., by a user of called party device 230), but not necessarily unwanted, connection. In such implementations, the criterion can indicate that the call should be provided to a voicemail associated with called party device 230, and/or that an alert message (e.g., a SMS message indicating receipt of the call) should be provided to called party device 230.

In some implementations, caller information that satisfies a criterion can indicate that calling party device 210 should be provided a recording (e.g., that plays no sound, that includes an announcement, and/or the like) and that the call should be released after the recording. For example, the criterion can be indicative of a request to establish an unwanted (e.g., by a user of called party device 230) connection.

In some implementations, caller information that satisfies a criterion can indicate that calling party device 210 should be provided a captcha (e.g., an audio captcha that calling party device 210 must satisfy) before the call is provided to called party device 230. For example, the criterion can be indicative of a request to establish an unexpected (e.g., by a user of called party device 230), but not necessarily unwanted, connection.

In some implementations, the caller information can satisfy a criterion when the caller information matches information in one or more lists (e.g., lists of caller names and/or caller numbers). For example, the caller information can satisfy a criterion when the caller information (e.g., caller name or caller number) matches information in a white list (e.g., a list of trusted caller numbers or caller names), a black list (e.g., a list of caller numbers or caller names to be blocked), a gray list, or another purpose-driven list. Such lists can be provided by a user of called party device 230, third parties, trusted sources, or authoritative sources to call handling platform 220.

In some implementations, the criteria can include objective criteria and/or industry lists, which can be used to identify caller information that can be associated with robocalling activities (e.g., telephone calls made using a computerized autodialer to deliver pre-recorded messages).

As further shown in FIG. 4, process 400 can include modifying the caller information based on determining that the caller information satisfies the criterion (block 440). For example, when call handling platform 220 determines that the caller information satisfies a criterion, call handling platform 220 can modify the caller information to provide additional information to indicate that the caller information satisfies the criterion. In some implementations, call handling platform 220 can modify the caller information, to provide the additional information, by adding characters to the caller information, changing characters in the caller information, deleting characters from the caller information, changing how the caller information will be displayed (e.g., changing a display color or causing the caller information to flash), adding a media file (e.g., an image file, an audio file, or a video file) to the caller information, and/or the like.

In some implementations, call handling platform 220 can modify or supplement the content of one or more fields (e.g., the caller name field or the caller number field) within the caller information to indicate that the caller information satisfies a criterion. For example, call handling platform 220 can add a character (e.g., an "*") or set of characters to one or more caller information fields (e.g., the caller name field or the caller number field). In some implementations, call handling platform 220 can insert a character or a set of characters at a position (e.g., the start, the end, and/or the like) of one or more caller information fields (e.g., the caller name field or the caller number field) to indicate that the caller information satisfies a criterion.

When modifying the caller information, call handling platform 220 can do so based on the satisfied criterion. For example, call handling platform 220 can modify the caller information to indicate which criterion and/or type of criterion was satisfied by the caller information. In some implementations, call handling platform 220 can add particular characters or combinations of characters to indicate particular satisfied criteria. For example, call handling platform 220 can add the characters "WL-" to the start of the caller name field and/or the caller number field to indicate that the caller information matches caller information in a white list. Alternatively, call handling platform 220 can, for example, add the character "!" to the start of the caller name field and/or the caller number field to indicate that the caller information matched a pattern suggestive of an unwanted call (e.g., a robocall). In some implementations, call handling platform 220 can modify the caller information to specify whether the caller information (e.g., a caller name or a caller number) and/or the calling party device information (e.g., a caller number) has been verified (e.g., has not been spoofed).

In some implementations, call handling platform 220 can replace or fill one or more caller information fields with a substitute value, such as UNKNOWN or PRIVATE. For example, call handling platform 220 can provide information indicating that a caller name for calling party device 210 cannot be received, provide a presentation indicator indicating that display of the caller name and/or the caller number is disallowed, and/or the like. In some implementations, call handling platform 220 can modify or supplement the substitute value (e.g., by inserting a character or a set of characters at the start of the substitute value) to indicate that caller information associated with an incoming call satisfies a criterion even though the caller information might be unavailable for display.

As further shown in FIG. 4, process 400 can include determining a call handling decision based on the modified caller information (block 450). For example, call handling platform 220 can determine a call handling decision (e.g., a decision on how to handle the request to establish a connection with called party device 230) based on the modified caller information. In some implementations, call handling platform 220 can compare the modified caller information with a call handling data structure (e.g., a table) that provides call handling decisions, as described in connection with FIG. 1C. In such implementations, call handling platform 220 can determine a call handling decision for the call based on comparing the modified caller information with the call handling data structure.

In some implementations, the call handling decision can include blocking the call, by preventing establishment of a connection with called party device 230, when the modified caller information matches a field in the call handling data structure indicating that the call should be rejected. For example, the call handling decision can include terminating the call at call handling platform 220.

In some implementations, the call handling decision can include permitting the call to proceed, by establishing a connection with called party device 230, when the modified caller information matches a field in the call handling data structure indicating that the call should be accepted. For example, the call handling decision can include forwarding the call and the modified caller information to called party device 230.

In some implementations, the call handling decision can include providing the call to a voicemail associated with called party device 230, when the modified caller information matches a field in the call handling data structure indicating that the call should be provided to voicemail. For example, the call handling decision can include providing the call to the voicemail associated with called party device 230.

In some implementations, the call handling decision can include providing the call to the voicemail associated with called party device 230 and alerting the called party device 230, when the modified caller information matches a field in the call handling data structure indicating that the call should be provided to voicemail and that called party device should be alerted. For example, the call handling decision can include providing the call to the voicemail associated with called party device 230, and providing an alert message (e.g., a SMS message indicating receipt of the call) to called party device 230.

In some implementations, the call handling decision can include providing a recording (e.g., that plays no sound, that includes an announcement, and/or the like) to calling party device 210 and releasing the call after providing the recording, when the modified caller information matches a field in the call handling data structure indicating that a recording should be provided to calling party device 210 and that the call should be released. For example, the call handling decision can include playing a recording for calling party device 230, and releasing (or dropping) the call after playing the recording.

In some implementations, the call handling decision can include providing a captcha (e.g., an audio captcha that calling party device 210 must satisfy) before providing the call to called party device 230. For example, the call handling decision can include playing an audio captcha for calling party device 210, and requesting a particular response to the audio captcha from calling party device 210. If calling party device 210 provides the particular response, call handling platform 220 can provide the call to called party device 230.

As further shown in FIG. 4, process 400 can include implementing the determined call handling decision. For example, process 400 can include forwarding the modified caller information to the called party device based on the call handling decision (block 460). For example, call handling platform 220 can forward the modified caller information to called party device 230 (e.g., for display to a user of called party device 230). In some implementations, call handling platform 220 can forward the modified caller information to a device, separate from called party device 230, and the device can forward the modified caller information to called party device 230.

In some implementations, the modified caller information (e.g., when forwarded to called party device 230) can be used to support determining how to handle a request to establish the connection with (e.g., a call to) called party device 230. For example, a user of called party device 230 can use the additional information included in the modified caller information to determine whether to accept a request to establish a connection (e.g., a call).

As further shown in FIG. 4, process 400 can include blocking the call from being provided to the called party device based on the call handling decision (block 470). For example, call handling platform 220 can block the call from being provided to called party device 230, based on the call handling decision, by preventing establishment of a connection between calling party device 210 and called party device 230. In some implementations, call handling platform 220 can block the call (e.g., the request to establish a connection with called party device 230) by terminating the call at call handling platform 220.

As further shown in FIG. 4, process 400 can include forwarding the call to a captcha, a voicemail, or other mechanism based on the call handling decision (block 480). For example, call handling platform 220 can forward the call to a captcha, a voicemail associated with called party device 230, or other mechanism based on the call handling decision. In some implementations, call handling platform 220 can provide the call to a voicemail associated with called party device 230, based on the call handling decision. In some implementations, call handling platform 220 can provide the call to the voicemail associated with called party device 230, and can provide an alert message (e.g., a SMS message indicating receipt of the call) to called party device 230, based on the call handling decision.

In some implementations, call handling platform 220 can provide a recording (e.g., that plays no sound, that includes an announcement, and/or the like) to calling party device 210, and can release the call after providing the recording, based on the call handling decision.

In some implementations, call handling platform 220 can play an audio captcha for calling party device 210, and can request a particular response to the audio captcha from calling party device 210, based on the call handling decision. If calling party device 210 provides the particular response, call handling platform 220 can provide the call and the modified caller information to called party device 230.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

In some implementations, call handling platform 220 can provide network level blocking of calls based on a standardized set of characters provided in caller information of a database that can be shared by multiple telecommunications carriers and/or systems (e.g., do not originate (DNO) systems).

In some implementations, call handling platform 220 can utilize results of an anti-spoofing system to determine criteria and/or call handling decisions to be applied by call handling platform 220.

In some implementations, call handling platform 220 can modify the caller information as described herein, and e-commerce based applications can configure and invoke different levels of identity verification based on the modified caller information.

In some implementations, call handling platform 220 can provide the modified caller information to a network intrusion detection system, and the network intrusion detection system can provide real-time analysis of patterns in the modified caller information that are associated with fraudulent use of an originating number of calling party device 210.

In some implementations, call handling platform 220 can provide the call handling functions described herein to an entire group of people (e.g., an entire customer base of a telecommunications carrier), or to a subset of people (e.g., a subset of customers of a telecommunications carrier users) determined based on a business, a location, subscriptions to particular services offered by the telecommunications carrier, enablement of a feature provided by the telecommunications carrier, and/or the like.

In some implementations, call handling platform 220 can be utilized with caller information that includes a particular number of characters (e.g., 15 characters, 35 characters, and/or the like). The particular number of characters can permit more combinations of modified caller information characters, which can increase a number of potential call handling decisions by call handling platform 220.

Some implementations, described herein, can provide a call handling platform that adds or augments additional information (e.g., information beyond a caller number and/or a caller name) to caller information associated with an incoming call, and utilizes the additional information to determine how to handle the incoming call. For example, the call handling platform can forward the call, the caller information, and the additional information to a called party device, can play a captcha before forwarding the call to the called party device, can forward the call to a voicemail, can prevent the call from being provided to the called party device, and/or the like.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments modify or augment caller information (e.g., caller ID information), it should be understood that such modification or augmentation shall be in accordance with all applicable laws concerning caller information.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A device, comprising:
one or more processors to:
receive a call from a calling party device to a called party device;
determine caller information based on the call from the calling party device;
determine that the caller information satisfies a criterion;
modify the caller information to create modified caller information,
the caller information being modified based on the caller information satisfying the criterion;
compare the modified caller information to a data structure that includes information associated with a plurality of call handling decisions;
identify a call handling decision, of the plurality of call handling decisions, based on comparing the modified caller information to the data structure that includes the plurality of call handling decisions; and
cause the call handling decision to be implemented.

2. The device of claim 1, where the one or more processors, when causing the call handling decision to be implemented, are to one of:
prevent the call from being provided to the called party device,
provide the call to a voicemail associated with the called party device,
provide the call to the voicemail and provide an alert message to the called party device,
provide a recording to the calling party device and release the call, request a particular response to a captcha, from the calling party device, before providing the call to the called party device, or provide the call and the modified caller information to the called party device.

3. The device of claim 1, where the one or more processors, when causing the call handling decision to be implemented includes providing the call and the modified caller information to the called party device, are to:

receive, from the called party device, feedback information associated with the call; and utilize the feedback information to modify the criterion.

4. The device of claim 1, where the caller information includes at least one field; and where the one or more processors, when modifying the caller information to create the modified caller information, are to:

add at least one character to the at least one field.

5. The device of claim 1, where the data structure includes:

information associated with characters added to the caller information, and information associated with starting positions of the characters in the caller information; and where the one or more processors, when identifying the call handling decision, are to:

determine that the modified caller information matches one of characters added to the caller information, and one of the starting positions of the characters in the caller information;

determine that the one of characters added to the caller information, and the one of the starting positions of the characters in the caller information are associated with the call handling decision; and identify the call handling decision based on determining that the one of characters added to the caller information, and the one of the starting positions of the characters in the caller information are associated with the call handling decision.

6. The device of claim 1, where the criterion is associated with an unwanted connection of the called party device; and where the one or more processors are further to:

determine that the caller information satisfies the criterion associated with the unwanted connection of the called party device;

add at least one character to the caller information, the at least one character designating the call as being associated with the unwanted connection of the called party device;

identify the call handling decision, based on the at least one character, as being to prevent the call from being provided to the called party device; and prevent the call from being provided to the called party device based on the call handling decision.

7. The device of claim 1, where the criterion is associated with a wanted connection of the called party device; and where the one or more processors are further to:

determine that the caller information satisfies the criterion associated with the wanted connection of the called party device;

add at least one character to the caller information, the at least one character designating the call as being associated with the wanted connection of the called party device;

identify the call handling decision, based on the at least one character, as being to provide the call to the called party device; and provide the call and the modified caller information to the called party device based on the call handling decision.

8. A non-transitory computer-readable medium storing instructions, the instructions comprising:

one or more instructions that, when executed by one or more processors, cause the one or more processors to:

receive a call from a calling party device to a called party device;

determine caller information based on the call from the calling party device;

determine that the caller information satisfies a criterion;

modify the caller information to create modified caller information, the caller information being modified based on the caller information satisfying the criterion;

compare the modified caller information to a data structure that includes information associated with a plurality of call handling decisions;

identify a call handling decision, of the plurality of call handling decisions, based on comparing the modified caller information to the data structure that includes the plurality of call handling decisions; and cause the call handling decision to be implemented.

9. The non-transitory computer-readable medium of claim 8, where the one or more instructions, that cause the one or more processors to cause the call handling decision to be implemented, cause the one or more processors to one of:

prevent the call from being provided to the called party device, provide the call to a voicemail associated with the called party device, provide the call to the voicemail and provide an alert message to the called party device, provide a recording to the calling party device and release the call, request a particular response to a captcha, from the calling party device, before providing the call to the called party device, or provide the call and the modified caller information to the called party device.

10. The non-transitory computer-readable medium of claim 8, where the call handling decision includes providing the call and the modified caller information to the called party device, and the instructions further comprise:

one or more instructions that, when executed by the one or more processors, cause the one or more processors to:

receive, from the called party device, feedback information associated with the call; and utilize the feedback information to modify the criterion.

11. The non-transitory computer-readable medium of claim 8, where the caller information includes at least one field; and where the one or more instructions, that cause the one or more processors to modify the caller information to create the modified caller information, cause the one or more processors to:

add at least one character to the at least one field.

12. The non-transitory computer-readable medium of claim 8, where the data structure includes:

information associated with characters added to the caller information, and information associated with starting positions of the characters in the caller information; and where the one or more instructions, that cause the one or more processors to identify the call handling decision, cause the one or more processors to:
  determine that the modified caller information matches one of characters added to the caller information, and one of the starting positions of the characters in the caller information;
  determine that the one of characters added to the caller information, and the one of the starting positions of the characters in the caller information are associated with the call handling decision; and
  identify the call handling decision based on determining that the one of characters added to the caller information, and the one of the starting positions of the characters in the caller information are associated with the call handling decision.

13. The non-transitory computer-readable medium of claim 8, where the criterion is associated with an unwanted connection of the called party device, and where the instructions further comprise:
  one or more instructions that, when executed by the one or more processors, cause the one or more processors to:
    determine that the caller information satisfies the criterion associated with the unwanted connection of the called party device;
    add at least one character to the caller information, the at least one character designating the call as being associated with the unwanted connection of the called party device;
    identify the call handling decision, based on the at least one character, as being to prevent the call from being provided to the called party device; and
    prevent the call from being provided to the called party device based on the call handling decision.

14. The non-transitory computer-readable medium of claim 8, where the criterion is associated with a wanted connection of the called party device, and where the instructions further comprise:
  one or more instructions that, when executed by the one or more processors, cause the one or more processors to:
    determine that the caller information satisfies the criterion associated with the wanted connection of the called party device;
    add at least one character to the caller information, the at least one character designating the call as being associated with the wanted connection of the called party device;
    identify the call handling decision, based on the at least one character, as being to provide the call to the called party device; and
    provide the call and the modified caller information to the called party device based on the call handling decision.

15. A method, comprising:
  receiving, by a device, a call from a calling party device to a called party device;
  determining, by the device, caller information based on the call from the calling party device;
  determining, by the device, that the caller information satisfies a criterion;
  modifying, by the device, the caller information to create modified caller information, the caller information being modified based on the caller information satisfying the criterion;
  comparing, by the device, the modified caller information to a data structure that includes information associated with a plurality of call handling decisions;
  identifying, by the device, a call handling decision, of the plurality of call handling decisions, based on comparing the modified caller information to the data structure that includes the plurality of call handling decisions; and
  causing, by the device, the call handling decision to be implemented.

16. The method of claim 15, where causing the call handling decision to be implemented comprises one of:
  preventing the call from being provided to the called party device,
  providing the call to a voicemail associated with the called party device,
  providing the call to the voicemail and providing an alert message to the called party device,
  providing a recording to the calling party device and release the call,
  requesting a particular response to a captcha, from the calling party device, before providing the call to the called party device, or
  providing the call and the modified caller information to the called party device.

17. The method of claim 15, where causing the call handling decision to be implemented includes providing the call and the modified caller information to the called party device, and the method further comprises:
  receiving, from the called party device, feedback information associated with the call; and
  utilizing the feedback information to modify the criterion.

18. The method of claim 15,
  where the data structure further includes:
    information associated with characters added to the caller information, and
    information associated with starting positions of the characters in the caller information; and
  where identifying the call handling decision comprises:
    determining that the modified caller information matches one of characters added to the caller information, and one of the starting positions of the characters in the caller information;
    determining that the one of characters added to the caller information, and the one of the starting positions of the characters in the caller information are associated with the call handling decision; and
    identifying the call handling decision based on determining that the one of characters added to the caller information, and the one of the starting positions of the characters in the caller information are associated with the call handling decision.

19. The method of claim 15, where the criterion is associated with an unwanted connection of the called party device; and
  where the method further comprises:
    determining that the caller information satisfies the criterion associated with the unwanted connection of the called party device;
    adding at least one character to the caller information, the at least one character designating the call as being associated with the unwanted connection of the called party device;

identifying the call handling decision, based on the at least one character, as being to prevent the call from being provided to the called party device; and preventing the call from being provided to the called party device based on the call handling decision.

20. The method of claim 15, where the criterion is associated with a wanted connection of the called party device; and where the method further comprises:

determining that the caller information satisfies the criterion associated with the wanted connection of the called party device;

adding at least one character to the caller information, the at least one character designating the call as being associated with the wanted connection of the called party device;

identifying the call handling decision, based on the at least one character, as being to provide the call to the called party device; and providing the call and the modified caller information to the called party device based on the call handling decision.

\* \* \* \* \*